(No Model.)

C. D. MENEELY.
ROLLER BEARING FOR AXLES AND SHAFTS.

No. 389,819. Patented Sept. 18, 1888.

WITNESSES:
Geo. A. Darby.
Charles D. Brintnall

INVENTOR
Charles D. Meneely
by W. E. Hagan his atty

UNITED STATES PATENT OFFICE.

CHARLES D. MENEELY, OF ALBANY, ASSIGNOR TO THE MENEELY HARDWARE COMPANY, OF WEST TROY, NEW YORK.

ROLLER-BEARING FOR AXLES AND SHAFTS.

SPECIFICATION forming part of Letters Patent No. 389,819, dated September 18, 1888.

Application filed November 16, 1886. Serial No. 218,991. (No model.)

*To all whom it may concern:*

Be it known that I, CHARLES D. MENEELY, of the city of Albany, county of Albany, State of New York, have invented new and useful Improvements in Roller-Bearings for Axles and Shafts, and of which the following is a specification.

My invention relates to improvements upon roller-bearings for shafts and axles; and the object and purpose of my invention are to increase their friction-reducing capacities and to better adapt them for the purposes for which they are designed.

Accompanying this specification to form a part of it there is a sheet of drawings containing five figures illustrating my invention, with the same designation of parts by letter-reference used in all of them.

Figure 2:
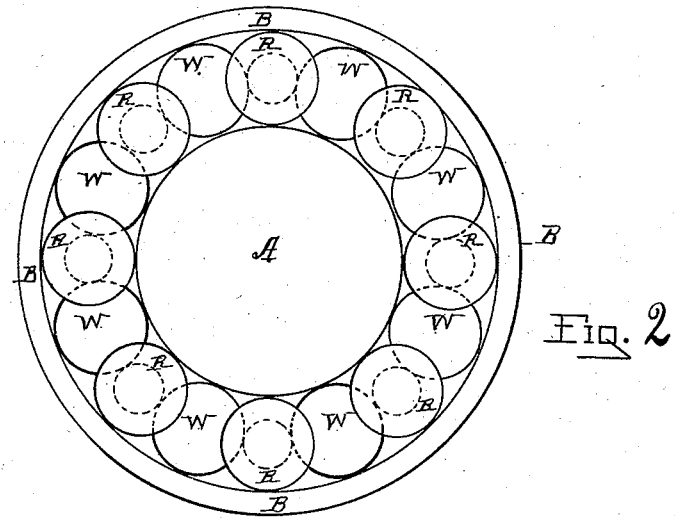
Figure 1:
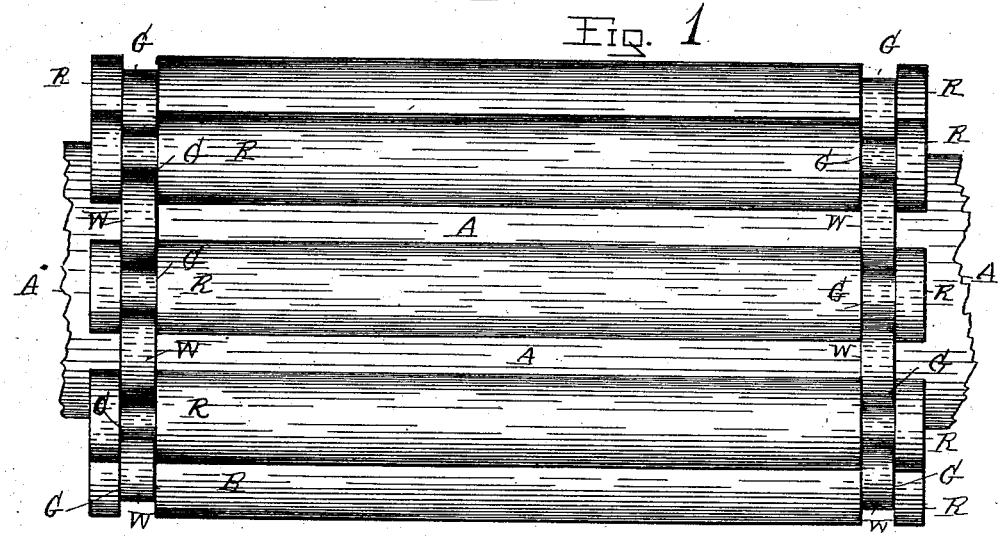
Figure 3:
Figure 4:
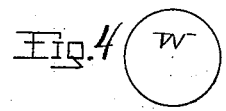
Figure 5:
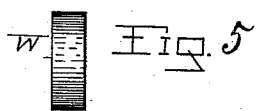

Of the illustrations, Figure 1 is a side elevation of my improved roller-bearing and axle with the axle-box removed. Fig. 2 is an end view of the same parts that are shown at Fig. 1 arranged within the axle-box. Fig. 3 is a side view of one of the rollers of the bearing illustrated as separated from the others. Fig. 4 is a plan view of one of the friction-wheels used in connection with the rollers, and Fig. 5 is a side view of one of the said friction-wheels.

The several parts of the apparatus thus illustrated are designated by letter-reference, and the function of the parts is described as follows:

The letters R designate rollers, of which there is a series for each bearing, and these rollers are arranged between the axle or shaft and the axle or journal-box in which the shaft or axle turns. Each of the rollers is formed with a rectangular annular groove near each end, the grooves being so located in each roller that when the whole number of rollers are in position the grooves are circumferentially in line.

A indicates the axle, and B the axle-box.

The letters W designate friction-wheels, consisting of plain metal disks, of which there is one arranged between each two of the rollers in the grooves therein at each end of the latter, with each of said wheels at opposite diametrical points of its periphery of each roller. When the axle or shaft revolves, the function of these wheels is to keep the rollers apart, and they would perform this function whether they have the same diameter as the rollers or less, and hence they may be made with the same diameter as the rollers or to have a diameter less than that of the rolls.

Where this class of devices is used in connection with axles sustaining great weight, such as car-axles, it is desirable to have the rollers of as great length as can be used to divide up the strain produced by the weight. Where long rollers are used they are liable to twist, so that they will not rotate in an axial line parallel with that of the axle itself, and to remedy this difficulty, so as to adapt this class of devices for vehicles of great weight, is one of the purposes of my improvement. The sides of the grooves G, forming shoulders that abut against the sides of the wheels placed therein, serve to keep the wheels and rollers both in position, so that both the wheels and rollers turn on axial lines that are parallel to that on which the axle rotates.

Heretofore devices have been made of the same class as my invention, composed of friction-rollers formed with end journals, made by reducing the diameter of the friction-rollers, and the rollers so constructed combined with a series of dividing wheels or disks having a thickness equal to the longitudinal length of the end journals, said dividing wheels or disks being arranged between the rollers, so as to bear upon said end journals and upon their outer side face to divide up the end-thrust of the bearings with the journal ends of the friction-rollers against the inside end faces of the bearing-box. Another construction shows rounded-out semicircular annular grooves made in the friction-rollers near the ends and the intermediate use of balls placed between the rollers in the grooves. My improvement on these older constructions has for its object the perfect rectilinear alignment of the friction-rollers in the direction of their rotation to insure uniformity of motion and wear, and to obtain in combination with this uniformity of motion and wear the use of the whole end face of the friction-rollers to take up together and uniformly distribute the force of the end-thrust of the ends of the rollers in contact with the inner end faces of the bearing-box. These better results I obtain by arranging the dividing-wheels in rectangular annular grooves formed in the friction-rollers near their ends, the rectilinear sides of the combined parts resulting in a perfect alignment in the direction of the rotation, and all the rollers being compelled to move together as one body to take up the end-thrust.

Having thus described my invention, what I claim, and desire to secure by Letters Patent, is—

In a roller-bearing, the combination, with the shaft and the axle-box, of the rollers R, formed with rectangular annular grooves G, arranged near each end of the rollers, and the dividing-wheels W, consisting of plain metal disks arranged in said grooves between the rollers, whereby the parts are held to move in the same direct circumferential line, substantially as specified.

Signed at Troy, New York, this 31st day of July, 1886, and in the presence of the two witnesses whose names are hereto written.

CHAS. D. MENEELY.

Witnesses:
CHARLES S. BRINTNALL,
W. E. HAGAN.